C. J. MANNING.
SAFETY VALVE.
APPLICATION FILED FEB. 23, 1917. RENEWED APR. 3, 1918.
1,265,693.
Patented May 7, 1918.
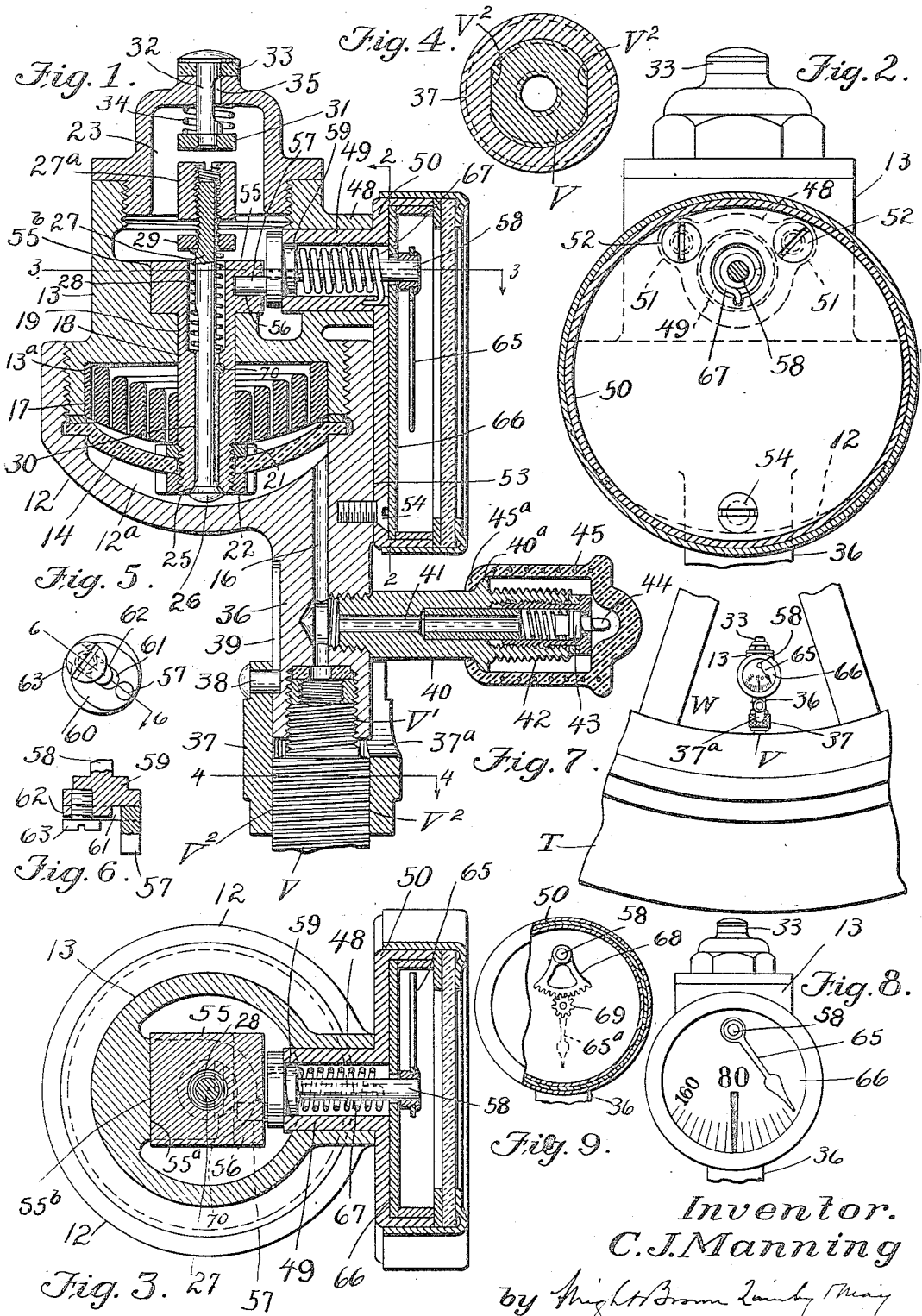
Inventor.
C. J. Manning
by Wright Brown [...]
Att'ys.

UNITED STATES PATENT OFFICE.

COLEMAN J. MANNING, OF MEDFORD, MASSACHUSETTS.

SAFETY-VALVE.

1,265,693.  Specification of Letters Patent.  Patented May 7, 1918.

Application filed February 23, 1917, Serial No. 150,315. Renewed April 3, 1918. Serial No. 226,529.

*To all whom it may concern:*

Be it known that I, COLEMAN J. MANNING, a citizen of the United States, residing at Medford, in the county of Middlesex and State of Massachusetts, have invented new and useful Improvements in Safety-Valves, of which the following is a specification.

This invention has for its object to provide an improved construction and arrangement of parts in a spring-closed safety valve, whereby a simple and effective valve is provided.

The invention also has for its object to provide a registering valve structure, including an indicator adapted to register the pressure existing in a pneumatic tire, or other reservoir, containing air or other fluid under pressure.

The invention is embodied in the improvements which I will now proceed to describe and claim.

Of the accompanying drawings, forming a part of this specification,—

Figure 1 is a vertical central section of a safety valve embodying the invention.

Fig. 2 is a section on line 2—2 of Fig. 1.

Fig. 3 is a section on line 3—3 of Fig. 1.

Fig. 4 is a section on line 4—4 of Fig. 1.

Fig. 5 is an end view of the rock-shaft and its wrist-pin-carrying hub, hereinafter referred to, showing means for radially adjusting the wrist-pin.

Fig. 6 is a section on line 6—6 of Fig. 5.

Fig. 7 is a side elevation, showing the safety valve applied to a pneumatic tired wheel.

Fig. 8 is an enlargement of a portion of Fig. 7.

Fig. 9 is a view partly in section but otherwise similar to Fig. 8, showing a modification.

The same reference characters indicate the same parts in all of the figures.

The casing of my improved safety valve includes two detachably connected sections 12 and 13, said sections having screw-threaded flanges whereby they are separably connected, as clearly shown by Fig. 1. The section 12 contains a recess 12ª, and the section 13 contains a recess 13ª, said recesses registering and inclosing a relatively large space.

Clamped between the sections 12 and 13 is a flexible diaphragm 14, which subdivides said space into a pressure-receiving chamber having an inlet 16, and a spring chamber containing a preferably volute spring 17, which normally maintains the diaphragm in position to contract the pressure chamber of which it forms one side, as shown by Fig. 1.

Attached to the central portion of the diaphragm 14 and movable therewith, is a tubular stem 18, adapted to slide in a guide 19 formed in the casing above the spring chamber, the stem 18 having an air tight connection with the diaphragm by means of clamping-nuts 21, 22, screwed upon its lower end, as shown by Fig. 1. Incidentally, the upper clamping-nut 21 forms an abutment for the spring 17.

The bore of the tubular stem 18 communicates at one end with the pressure chamber, and at the opposite end with a chamber 23 at the upper end of the casing, said chamber having a vent to the atmosphere, so that fluid pressure passing through the valve stem, enters the chamber 23 and escapes therefrom.

The lower end of the stem bore is provided with a valve seat 25, which is normally closed by a relief valve 26. Said valve is provided with a rod 27 extending through the tubular stem 18 and into the chamber 23. A relatively light spring 28, seated at one end on an abutment in a cavity in the stem 18, and at its opposite end on an abutment or shoulder 29, attached to the rod 27, normally exerts pressure on the rod to close the valve 26.

The bore of the stem 18 and a portion of the perimeter of the rod 27 form a relief duct 30, which permits the passage of fluid under pressure from the pressure chamber to the vent chamber, when the valve 26 is open, this duct being conveniently formed by the cutting away of a portion of the periphery of the rod 27.

The casing is provided with an abutment 31 arranged to contact with the upper end of the rod 27 when said rod is raised to a predetermined height by pressure acting on the diaphragm, and thus arrest the movement of the rod 27 and valve 26, so that the continued movement of the diaphragm and its stem will separate the valve seat 25 from the valve 26, and thus permit pressure to escape through the duct 30.

The abutment 31 is preferably a head formed on the stem 32 of a valve 33, which is normally held by the spring 34 in position to close the vent orifice 35 in the casing, the stem 32 being cut away at one side, as shown by Fig. 1, so that when the valve 33 is raised, an outlet is formed from the chamber 22 to the atmosphere. The object of the valve 33 is to prevent the admission of dust and dirt to the casing. The spring 34 is stronger than the valve-closing spring 28, so that when the valve rod 27 rises and first strikes the abutment 31, the valve 26 is opened before the spring 34 yields. When the upward movement of the stem 18 is sufficiently continued to cause its upper end to abut against the shoulder 29, the rod is supported by and moved with the stem 18, the spring 34 yielding and causing the valve 33 to open. It is obvious that, if the exclusion of dust and dirt is not an object, the abutment 31 may be rigid and the vent 35 may be left continuously open.

It will be seen that the structure thus far described is of simple and durable construction, adapted to maintain a considerable pressure in a reservoir with which the casing is connected, to quickly open when the pressure reaches a predetermined degree, and to quickly close when the pressure is suitably reduced.

As shown by the drawings, the valve is adapted for use on a vehicle wheel W, having a pneumatic tire T, the casing being provided with a stem 36 through which the pressure inlet 16 extends. The stem 36 is provided with means for engaging the usual tubular threaded portion V of a tire valve, the lower end of the shank being internally enlarged and provided with an internal screw-thread engaging an external thread on the reduced upper end V' of the valve portion V.

37 represents a coupling sleeve adapted to reinforce or strengthen the connection between the shank 36 and the valve portion V, said sleeve being adapted to slide loosely on the shank and valve portion, and provided with a stud 38 entering a slot 39 in the shank, said stud and slot limiting the sliding movements of the sleeve. The sleeve 37 normally occupies the position shown by Fig. 1, its upper portion embracing the lower end of the shank 36, and its lower portion embracing the upper end of the valve portion V, the sleeve acting as a socketed enlargement on the said valve portion.

The shank 36 is provided with a laterally projecting tubular nipple 40, the bore 41 of which communicates with the pressure inlet 16. The outer end of the nipple is externally threaded at 42, for connection with an air pump or a conduit connecting the air pump with the nipple. The nipple is provided with a suitable spring-closed valve 43 having a projecting stem 44 adapted to be displaced by the air pump connection.

It will be seen that the nipple 40 is, to all intents and purposes, the valved end of an ordinary tire valve, such as is ordinarily employed at the outer end of a valve portion V. 45 represents an elastic cap or cover, detachably engaged with the nipple 40, and protecting its outer end portion from dust and dirt.

When the cap 45 is removed, and an air pump is suitably engaged with the nipple 40, air may be pumped into the tire T. As the pressure rises, the diaphragm 14 is gradually displaced from its normal position. When the displacement is sufficient to open the duct 30, as above described, the pressure is reduced until the valve 26 closes.

The cap 45 is of larger internal diameter than the threaded portion 42 of the nipple 40, and is contracted at its inner end to form a resilient flange 45ª adapted to engage a rigid flange or shoulder 40ª on the nipple. The cap may be, therefore, easily applied and removed. The reinforcing sleeve 37 is held by centrifugal force in the position shown, when the wheel is in motion, and it may be caused to frictionally engage the valve portion V with sufficient force to prevent movement from its operative position, in case the wheel comes to rest with the valve casing at the highest portion of the wheel. The sleeve is cut away at one side to form a recess 37ª, which receives the nipple 40 when the sleeve is displaced upwardly to remove its lower end from the valve portion V. Said valve portion has the usual flattened sides V² (Fig. 4), and the internal surface of the sleeve is provided with corresponding flat portions engaging the sides V², so that the sleeve cannot turn on the valve portion V. The shank 36 is prevented from turning in the sleeve by the slot 39 and stud 38. The indicator-box hereinafter described is therefore caused to face in a predetermined direction, and cannot be accidentally turned.

The valve rod 27 is provided with an adjustable terminal 27ª, which may be a nut engaged with a threaded portion of the rod and adapted to vary its operative length and the degree of pressure required to open the relief valve 26.

The terminal 27ª may be rotated by a screw-driver to adjust it on the rod 27. To prevent the rod from turning with the nut, I provide a pin 70 (Figs. 1 and 5) bearing on a flattened side portion of the rod, said pin being inserted in the stem 18.

To permit the application of pressure-registering or indicating means to the described valve, I provide the upper section 13 of the casing with an annular projection 48, surrounding a circular opening adapted to receive a tubular shank 49 on a circular indicator box or holder 50, the outer end of the projection forming an abutment for the inner side of said box, and being provided with ears 51, shown by dotted lines in Fig. 2, to receive attaching screws 52. The lower section 12 of the casing is provided at one side with a flat face 53 (Fig. 1), receiving another attaching screw 54. The indicator-box attached as described to the casing sections 12, 13, prevents either section from turning relatively to the other. The tubular stem 18 is provided with a head or enlargement 55, one side of which contains a slot 56 receiving an eccentric wrist-pin 57 rigidly connected with a rock-shaft 58 which extends through the tubular shank 49 into the indicator-box 50. The head 55 is provided with a flat side 55ª (Fig. 3), in sliding contact with a flat sided face 55ᵇ formed in the casing, to prevent the stem and its head from turning, the slot 56 being thus caused to face in the proper direction. Said rock-shaft is provided with an enlargement or hub 59 adapted to turn in the shank 49. The wrist-pin 57 may be rigidly or immovably connected with the hub 59, as indicated by Fig. 1. If desired, however, the wrist-pin may be radially adjustable on the hub, as shown by Figs. 5 and 6, the wrist-pin being provided with a slotted ear 60, the slot 61 of which receives a boss 62 on the outer face of the hub 59, as shown by Figs. 5 and 6. A clamping-screw 63 engaged with the hub 59 and passing through the slot 61 adjustably secures the wrist-pin to the hub, and permits the radial adjustment of the wrist-pin to vary its throw, and the extent of rotary movement imparted to it and to the rock-shaft by movements of the stem 18.

In the embodiment of the invention shown by Figs. 1, 2, 3, 7, and 8, the rock-shaft carries a pointer 65, which is movable by the rock-shaft over a graduated sector at the lower portion of a dial 66. A helical spring 67 engaged at one end with a fixed part, such as the shank 49, and at its other end with the hub 59, exerts torque in one direction on the rock-shaft to prevent lost or loose motion of the wrist-pin 57 in the slot 56.

In the embodiment of the invention shown by Fig. 9, a rack segment 68 is attached to the outer end of the rock-shaft and engages a pinion 69 on the hub of a pointer 65ª, which is mounted to swing on a bearing at the center of the dial.

It will be seen that the described movements of the diaphragm and its stem cause pressure-indicating movements of the pointer 65 or 65ª, so that the degree of pressure in the tire or other reservoir, is at all times indicated.

The shank 36 is preferably offset as shown by Fig. 1, so that the main portion of the casing projects from one side of the stem, while the indicator-box and the nipple 40 project from the opposite side. Provision is thus made for engaging the casing with the usual valve portion V located between adjacent spokes of the wheel W, and for preventing objectionable projection of the casing, indicator-box, and nipple from the sides of the wheel.

I do not limit myself to the described adaptation of the invention to pneumatic tires, it being obvious that the invention may be embodied in safety valves for various other purposes.

I claim:

1. A safety valve comprising a casing having an inclosed space, a pressure inlet communicating with one side of said space, and a pressure outlet communicating with the opposite side thereof and provided with a normally closed dust-excluding valve, a diaphragm forming one side of a pressure-receiving chamber communicating with said inlet, a spring normally holding the diaphragm in position to contract said chamber, a guide in the casing, a tubular stem attached to the diaphragm and movable in said guide, the bore of said stem opening into said chamber and having a valve seat, and a spring-pressed relief valve normally closing said seat and provided with a rod movable with said stem, the rod and stem forming a relief duct communicating with the pressure outlet, and an abutment in the casing arranged to contact with the valve means being provided for simultaneously opening the relief valve and the outlet valve when the diaphragm is displaced.

2. A safety valve comprising a casing having an inclosed space, a pressure inlet communicating with one side of said space, and a pressure outlet communicating with the opposite side thereof, a diaphragm forming one side of a pressure-receiving chamber communicating with said inlet, a spring normally holding the diaphragm in position to contract said chamber, a guide in the casing, a tubular stem attached to the diaphragm and movable in said guide, the bore of said stem opening into said chamber and having a valve seat, a spring-pressed relief valve normally closing said seat and provided with a rod extending through and movable with said stem, the rod and stem forming a relief duct communicating with the pressure outlet, a dust-excluding valve for said outlet, having a stem extending through the outlet and forming an abutment for the valve rod, and a spring adapted to normally close the outlet valve and yield to the displacing pressure of the valve rod.

3. A safety valve comprising a casing composed of separable sections each containing a recess, said recesses coinciding and forming a relatively large inclosed space, one section having a pressure inlet and the other an outlet, a diaphragm marginally clamped between said sections and subdividing said space into a pressure-receiving chamber and a spring chamber, a volute spring seated in the spring chamber and exerting pressure on the diaphragm to normally contract the pressure chamber, a tubular stem attached to said diaphragm and movable in a guide in the casing, the bore of said stem having a valve seat, a spring-pressed relief valve normally closing said seat and provided with a rod extending through said stem, the stem and rod forming a relief duct communicating with the outlet, and an abutment in the casing arranged to coöperate with said rod in opening the relief valve when the diaphragm, stem, and rod are displaced.

4. A registering safety valve comprising a casing having a pressure inlet and a pressure outlet, a flexible diaphragm forming one side of a pressure chamber communicating with said inlet, a spring normally holding said diaphragm in position to contract said chamber, the diaphragm being movable in one direction by an increase of pressure in said chamber and in the opposite direction by said spring, a stem movable with said diaphragm, an indicator-box attached to the casing, a passage being provided between the box and the interior of the casing, and indicating means including a rock-shaft in said passage, connections between said rock-shaft and stem, and a pointer movable by said rock-shaft, means being provided for normally closing said pressure outlet, said means being operable by an increase of pressure in said chamber to open the pressure outlet.

5. A registering safety valve comprising a casing having a pressure inlet, a spring-pressed diaphragm forming one side of a pressure chamber communicating with said inlet, a stem movable with said diaphragm, a pressure outlet being provided from said chamber, a relief valve normally closing said pressure outlet, means responsive to movements of the diaphragm for opening and closing said relief valve, an indicator-box attached to the casing, a passage being provided between said box and the interior of the casing, and indicating means including a rock-shaft in said passage, connections between said rock-shaft and the stem, and a pointer movable by the rock-shaft.

6. A registering safety valve comprising a casing having a pressure inlet and a pressure outlet, a spring-pressed diaphragm forming one side of a pressure chamber communicating with said inlet, a tubular stem attached to and movable with said diaphragm, a guide in the casing for said stem, a relief valve associated with said stem, means responsive to movements of the diaphragm for opening and closing said valve, an indicator-box attached to the casing, a passage being provided between the said box and the interior of the casing, and indicating means including a rock-shaft in said passage, connections between said rock-shaft and the tubular stem, and a pointer movable by the rock-shaft.

7. A registering safety valve comprising a casing having a pressure inlet and a pressure outlet, a spring-pressed diaphragm forming one side of a pressure chamber communicating with said inlet, a tubular stem attached to and movable with said diaphragm, and provided with a slotted head, a guide in the casing for said stem, an indicator-box attached to the casing and provided with a tubular shank extending through one side of the casing, a rock-shaft journaled in said shank and provided at one end with a wrist-pin engaging the slot in the stem-head, and a pointer in the indicator-box movable by rocking movements of the rock-shaft.

8. A registering safety valve comprising a casing having a pressure inlet and a pressure outlet, a spring-pressed diaphragm forming one side of a pressure chamber communicating with said inlet, a tubular stem attached to and movable with said diaphragm, and provided with a slotted head, a guide in the casing for said stem, an indicator-box attached to the casing and provided with a tubular shank extending through one side of the casing, a rock-shaft journaled in said shank and provided at one end with a wrist-pin engaging the slot in the stem-head, and a pointer in the indicator-box movable by rocking movements of the rock-shaft, a spring being provided to prevent loose movement of the wrist-pin in said slot.

9. A registering safety-valve comprising a casing having a pressure inlet and a pressure outlet, a spring-pressed diaphragm forming one side of a pressure chamber communicating with said inlet, a tubular stem attached to and movable with said diaphragm, a guide in the casing for said stem, a relief valve associated with said stem, means responsive to movements of the diaphragm for opening and closing said valve, an indicator-box attached to the casing, a passage being provided between the said box and the interior of the casing, and indicating means including a rock-shaft in said passage, connections between said rock-shaft and the tubular stem, and a pointer movable by the rock-shaft, the casing being provided with an offset shank adapted to engage a tire valve and provided with a valved laterally projecting nipple adapted to engage a pump connection.

10. A registering safety-valve comprising a casing having a pressure inlet and a pressure outlet, a spring-pressed diaphragm forming one side of a pressure chamber communicating with said inlet, a tubular stem attached to and movable with said diaphragm, a guide in the casing for said stem, a relief valve associated with said stem, means responsive to movements of the diaphragm for opening and closing said valve, an indicator-box attached to the casing, a passage being provided between the said box and the interior of the casing, and indicating means including a rock-shaft in said passage, connections between said rock-shaft and the tubular stem, and a pointer movable by the rock-shaft, the nipple having a rigid external shoulder and being provided with an elastic cap having a contracted end adapted to detachably engage said shoulder.

11. A safety valve casing having a shank containing a pressure inlet and provided with an internally threaded socket, adapted to engage a threaded tire valve, and a reinforcing sleeve slidable on said shank and engaged therewith to permit a sliding movement without rotation, the sleeve being internally formed to slidingly engage a standard tire valve without rotation thereon, so that the shank and casing are prevented by the sleeve from turning on the tire valve.

12. A safety valve casing having a shank containing a pressure inlet and provided with an internally threaded socket, adapted to engage a threaded tire-valve, and a reinforcing sleeve slidable on said shank and engaged therewith to permit a sliding movement without rotation, the sleeve being internally formed to slidingly engage a standard tire valve without rotation thereon, so that the shank and casing are prevented by the sleeve from turning on the tire valve, the shank being provided with a laterally projecting valved nipple, and the sleeve being recessed to receive said nipple when the sleeve is displaced from its operative position.

13. A registering safety valve casing comprising sections separably connected by screw-threads, and an indicator-box seated on and attached to each of said sections, and preventing independent rotary movement of either section.

In testimony whereof I have affixed my signature.

COLEMAN J. MANNING.